United States Patent
Bernard et al.

(10) Patent No.: US 8,073,891 B2
(45) Date of Patent: Dec. 6, 2011

(54) METHOD FOR IMPLEMENTING MONTGOMERY MODULAR MULTIPLICATION AND DEVICE THEREFORE

(75) Inventors: Florent Bernard, Lognes (FR); Alain Sauzet, Bondoufle (FR); Eric Garrido, Montmorency (FR)

(73) Assignee: Thales (FR)

( * ) Notice: Subject to any disclaimer, the term of this patent is extended or adjusted under 35 U.S.C. 154(b) by 908 days.

(21) Appl. No.: 11/910,443

(22) PCT Filed: Mar. 31, 2006

(86) PCT No.: PCT/EP2006/061235
§ 371 (c)(1),
(2), (4) Date: Apr. 11, 2008

(87) PCT Pub. No.: WO2006/103288
PCT Pub. Date: Oct. 5, 2006

(65) Prior Publication Data
US 2009/0037508 A1 Feb. 5, 2009

(30) Foreign Application Priority Data
Apr. 1, 2005 (FR) ...................................... 05 03178

(51) Int. Cl.
*G06F 7/72* (2006.01)
(52) U.S. Cl. ........................................................ 708/491
(58) Field of Classification Search .................. None
See application file for complete search history.

(56) References Cited

U.S. PATENT DOCUMENTS

| | | | |
|---|---|---|---|
| 5,133,069 A | 7/1992 | Asato et al. | |
| 6,804,696 B2 * | 10/2004 | Chen et al. | 708/491 |
| 7,805,479 B2 * | 9/2010 | Moshier et al. | 708/491 |
| 2002/0116430 A1 * | 8/2002 | Chen et al. | 708/491 |
| 2002/0194237 A1 * | 12/2002 | Takahashi et al. | 708/491 |
| 2004/0267855 A1 * | 12/2004 | Shantz et al. | 708/523 |
| 2005/0033790 A1 | 2/2005 | Hubert | |
| 2007/0233769 A1 * | 10/2007 | Moshier et al. | 708/491 |
| 2009/0086961 A1 * | 4/2009 | Sauzet et al. | 380/28 |
| 2009/0089350 A1 * | 4/2009 | Sauzet et al. | 708/491 |
| 2010/0235414 A1 * | 9/2010 | Huang et al. | 708/207 |

OTHER PUBLICATIONS

Peter Kornerup: "A systolic, linear-array multiplier for a class of right-shift algorithms"; IEEE Transactions on Computers 43 (1994), No. 8, 892-898.
L-S Didier, J-C Bajard and P. Kornerup: "An RNS Montgomery multiplication Algorithm, Proceedings of ARITH13"; IEEE Computer Society, 1997, pp. 234-239.
Alexandre F. Tenca and Cetin K. Koc: "A scalable architecture for Montgomery multiplication"; CHES'99, 1999.

(Continued)

*Primary Examiner* — David H Malzahn
(74) *Attorney, Agent, or Firm* — Lowe Hauptman Ham & Berner, LLP

(57) ABSTRACT

Device for implementing modular multiplication, characterized in that it comprises at least one computation cell comprising a multiplier-adder comprising p pipelined logic-register pairs, receiving several digits to be added together and multiplied, at least two outputs corresponding to the low order and to the high order, an adder receiving the two outputs of the multiplier-adder, the number p being chosen in such a way that the maximum frequency of the multiplier-adder is greater than or equal to the maximum frequency of the adder.

7 Claims, 2 Drawing Sheets

OTHER PUBLICATIONS

Figure 1:
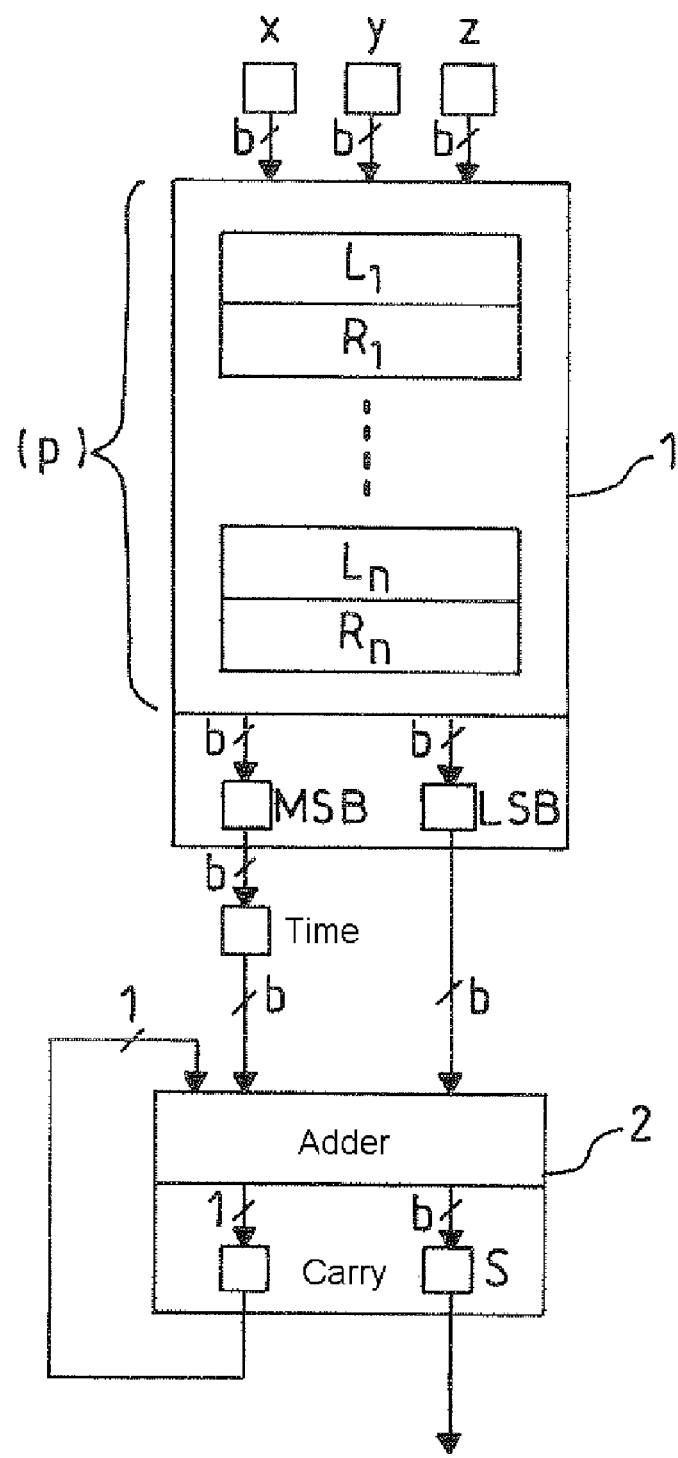

Alexandre F. Tenca and Cetin K. Koc: "A scalable architecture for Modular Multiplication based on Montgomery's Algorithm"; IEEE Transactions on computers 52 (2003), No. 9.

Alexandre F. Tenca, Cetin K. Koc and Erkay Savas: "A scalable and unified multiplier architecture for finite field GF (p) and GF (2n)"; CHES'00 2000.

Alexandre F. Tenca, Georgi Todorov and Cetin K. Koc: "High-Radix Design of a scalable modular multiplier"; CHES'01, vol. LNCS 2162, 2001, pp. 185-201.

Gunnar Gaubatz: "Versatile Montgomery Multiplier Architectures"; PhD thesis, Worcester Polytechnic Institute, Apr. 2002.

* cited by examiner

METHOD FOR IMPLEMENTING MONTGOMERY MODULAR MULTIPLICATION AND DEVICE THEREFORE

CROSS-REFERENCE TO RELATED APPLICATIONS

The present Application is based on International Application No. PCT/EP2006/061235, which in turn corresponds to French Application No. 05 03178 filed Apr. 1, 2005 and priority is hereby claimed under 35 USC §119 based on these applications. The application is hereby incorporated by reference in its entirety into the present application.

The invention relates to a method and a device for executing a Montgomery modular multiplication.

It is notably used in the field of cryptology, in integrated circuits of FPGA (Field Programmable Gate Array) or ASIC (Application Specific Integrated Circuit) type. Modular multiplication is done over a modular ring (Z/NZ) or over a field (Z/pZ) with p a prime number.

In the description, the operating frequency of a pipelined multiplier-adder with p stages is defined as given by the inverse of the time to cross a threshold of the stages of the multiplier-adder.

In the description, the term "pipeline" is defined as an operation consisting in adding register barriers between the logic phases and the architecture resulting therefrom.

Modular multiplication is at the core of numerous public-key crypto systems (RSA, ECDSA).

The encipherment and signature operations exhibit different constraints which require notably a fast, flexible and inexpensive architecture in terms of hardware resources.

Two flexibility levels are thus defined:
  The first level is located before the synthesis of the architecture. The design of the architecture must comprise sufficient degrees of freedom to be able to satisfy given hardware/time constraints.
  The second level is located after the synthesis of the architecture.
  The architecture must be capable of processing various sizes of data so as to be able to perform operations of ECDSA type (Elliptic Curve Digital Signature Algorithm) of size 256-512 bits and also operations of RSA type (from the name of its inventors: Rivest, Shamir, Adleman) of size 1024-4096 bits.

To evaluate the performance of an architecture, the time*area product is used. The time is given in terms of number of clock cycles. The area is estimated in terms of number of equivalent Nand gates (ASIC) or in terms of elementary cells (LC (Logic Cell) or CLB (Configuration Logic Block), sequential combinatorial blocks, for FPGAs or field-programmable gate arrays).

The prior art describes various exemplary devices and methods using modular multiplication in asymmetric cryptography.

The most frequent implementations of modular multiplication are of systolic type and use the Montgomery algorithm. Numerous publications deal with these implementations. The reference in this field being due to Peter Kornerup, A systolic, linear-array for a class of right-shift algorithms, IEEE Transactions on Computers 43 (1994), no. 8, 892-898.

Modular multiplication can also be implemented according to the algorithm of Barret, Johann Großschädl, High speed RSA Hardware based on Barret's modular reduction method, CHES'00, 2000.

The latter type of implementation, although efficacious, exhibits the drawback of not being flexible, since it is defined on a given size and cannot handle operations of greater sizes.

"Exotic" number representations (that is to say unconventional ones, such as for example the RNS (Residue Number System) representation) are also used to parallelize the implementation of modular multiplication, for example, L-S Didier, J-C Bajard and P. Kornerup, An RNS Montgomery multiplication Algorithm, Proceedings of ARITH13, IEEE Computer Society, 1997, pp. 234-239. However, this solution requires significant hardware resources and does not solve the flexibility problem.

Devices exhibiting flexible architectures, or "scalable hardware", are also known. The first publication of such an architecture is due to Alexandre F. Tenca and Cetin K. Koç, A scalable architecture for Montgomery multiplication, CHES'99, 1999.

Other more recent publications take up the idea developed in this article and propose improvements and extensions. Such is the case in:
  Alexandre F. Tenca and Cetin K. Koç, A scalable architecture for Modular Multiplication based on Montgomery's Algorithm, IEEE Transactions on computers 52 (2003), no 9.
  Alexandre F. Tenca, Cetin K. Koç and Erkay Savas, A scalable and unified multiplier architecture for finite field GF(p) and GF($2^n$), CHES'00, 2000.
  Alexandre F. Tenca, Georgi Todorov and Cetin K. Koç, High-Radix Design of a scalable modular multiplier, CHES'01, vol. LNCS 2162, 2001, pp. 185-201.
  Gunnar Gaubatz, Versatile Montgomery Multiplier Architectures, PhD thesis, Worcester Polytechnic Institute, April 2002.

These architectures are based on wiring up small elementary cells composed of an adder and a multiplier. These devices address the flexibility problem. However, these structures entail choosing a low internal bus size. The number of cycles to perform a modular multiplication is therefore high.

Before explaining the device and the steps of the method according to the invention a few reminders relating to the Montgomery algorithm are given.

The Montgomery algorithm used is as follows:
  $MM_n S(A,B,N)$
  $S \leftarrow a_0 B$
  For i from 1 to n do
    $m_i \leftarrow S_0 N'$ mod r
    $S \leftarrow a_i B + (m_i N + S)/r$
  $m_{n+1} \leftarrow S_0 N'$ mod r
  $S \leftarrow (m_{n+1} N + S)/r$
  Return S The step $S \leftarrow a_i B + (m_i N + S)/r$ is the most expensive from a computation time point of view. It may be noted that this step is obtained by doing the same operation twice: digit×long integer+long integer→long integer $(x_i Y + Z \rightarrow Z)$.

This step is performed by looping over the digits (numbers) of the two long integers (Y and Z).

However, two cases are distinguished depending on whether or not the shift is performed.

Classical Multiplication: $a_i B + T \rightarrow S$     (1)

This multiplication-addition is performed by the following loop:
  c=0
  For j going from 0 to n do:
    $P \leftarrow a_i b_j + t_j + c$
    $s_j \leftarrow LSB(P)$
    $c \leftarrow MSB(P)$
  $s_{n+1} = c$ For iteration j=n, $b_j \leq 1$, therefore $P \leq 3(r-1)=2r+r-3$, which implies $MSB(P) \leq 2$. It follows from this that $s_{n+1} \leq 2$.

Remark:

The basic operation is $x \times y+z+c$ with x, y, z and c lying between 0 and r−1. The result therefore lies between 0 and $r^2-1$, representable by two digits.

$$\text{Multiplication and shift: } (m_i N + S/r) \to T \quad (2)$$

In the particular case of division by r (right shift), the loop is the same as above, with a shift of index at the output T level.

Specifically, the determination of $m_i$ renders the quantity $P=m_i \times N_0+s_0$ divisible by r. In that case, LSB(P) is certainly zero. Therefore this first value (index−1) is intentionally "dropped", the first significant value ($t_0$) being obtained at the following iteration (j=1).

On account of the shift of index, the last iteration (j=n) will give access to the value $t_{n-1}$. The value $t_n$ will therefore be obtained by adding c=MSB(P) of iteration j=n with $s_{n+1}$.

The loop is therefore as follows:

c=0
For j going from 0 to n do:
$P \leftarrow m_i N_j + s_j + c$
$t_{j-1} \leftarrow LSB(P)$
$c \leftarrow MSB(P)$
$t_n = c + s_{n+1}$ For iteration j=n, $N_j=0$, therefore $P \leq 2(r-1)=r+r-2$, which implies $MSB(P) \leq 1$.

It follows from this that $t_n \leq 3$.

As $r \geq 4$, it follows from this that T is indeed represented by n+1 digits.

The present invention relies on a new approach which considers notably, during normal operation, a unique cell of bigger size than the cells considered in the prior art and a self-iteration process using a Montgomery algorithm with a high base. That is to say hereinafter, the base r is assumed to be larger than or equal to 4. In practice the base r usually corresponds to $2^{32}$ or to $2^{64}$, thereby justifying the terminology high base.

The invention relates to a device for implementing modular multiplication characterized in that it comprises at least one computation cell comprising a multiplier-adder comprising p pipelined logic-register pairs, receiving several digits to be added together and multiplied, at least two outputs corresponding to the low order and to the high order, an adder receiving the two outputs of the multiplier-adder, the number p being chosen in such a way that the maximum frequency of the multiplier-adder is greater than or equal to the maximum frequency of the adder.

The device can comprise a low part multiplier whose inputs correspond to the LSB output of the adder and to a precomputed constant, said multiplier being pipelined over a depth k.

The invention exhibits notably the following advantages: the use of a higher base reduces the number of cycles necessary for the computation of a modular multiplication. A single elementary cell is then used. The time area product of this architecture is therefore improved.

Figure 2:
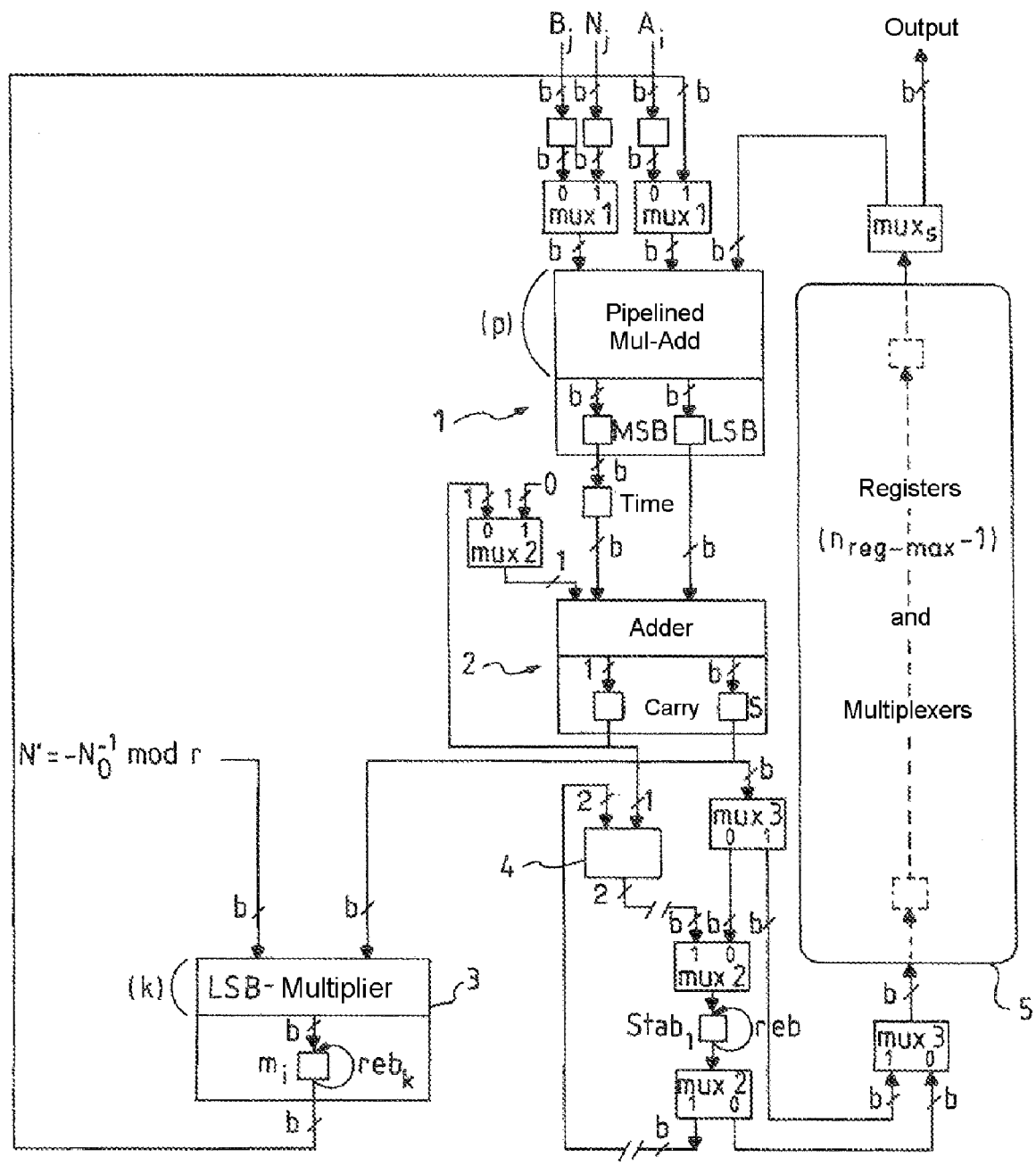

Other characteristics and advantages of the present invention will be further apparent on reading the description which follows of an exemplary embodiment given by way of wholly nonlimiting illustration together with the figures which represent:

FIG. 1 an exemplary arrangement of the elementary components of a multiplier-adder cell according to the invention, FIG. 2 an exemplary arrangement of the components constituting the core of the Montgomery modular multiplier.

The idea implemented in the multiplier according to the invention consists notably in splitting the operation $x \times y+z+c$ into $(x \times y+z)+c$, by pipelining the multiplication-addition operation $(x \times y+z)$ and by adding, as the results are obtained, the variable c, where x, y and z are the data, c being the high-order digit originating from the previous iteration.

Pipeline

The pipeline consists in adding register barriers between the logic phases so as to reduce the critical path, and thus increase the maximum operating frequency (theoretically that of an adder with base r).

The pipeline depth of an elementary component is defined by its number of internal registers. The output register is not counted.

Implementation of Multiplication-Addition

The example given in FIG. 1 assumes that a pipelined multiplier-adder 1, of depth p, is available.

It comprises notably a set of logic-register pairs (li, ri). The number p of these pairs is chosen notably so that the maximum frequency F1max of the pipelined multiplier-adder is greater than or equal to the maximum frequency F2max of the adder, the values of these two frequencies being as close as possible.

The maximum operating frequency of the adder is given by the inverse of the time to execute the multiplication-addition operation, while the maximum operating frequency of the pipelined multiplier-adder is given by the inverse of the time to execute a single one of the p stages. For optimal operation, the maximum frequency of the adder is determined, thereby giving the execution time of the adder and the adder is split up into p stages whose crossing time is less than or equal, but as close as possible, to the execution time of the adder.

The inputs of the multiplier-adder 1 correspond to three digits: x, y and z and the output is a pair of digits corresponding to LSB $(x \times y+z)$ and MSB $(x \times y+z)$. The output is held on two digits.

The results of the multiplier-adder are transmitted to a three-input adder, referenced 2: digit+digit+carry→digit+carry, operating in 1 cycle (pipeline 0) at the frequency F2max.

Hereinafter, b will denote the size of the internal bus (the assumption which is made is: $b \geq 2$ so as to satisfy $r \geq 4$), $(r=2^b)$.

The register Temp corresponds to the storage of c necessary for the following computation: addition of c with the following LSB and the previous carry.

The data (digits of $x \times y+z$) therefore exit in series at each cycle, low-order digit leading, in the same direction as the carry propagation.

FIG. 2 describes an exemplary arrangement of the component of FIG. 1, with a device 3 suitable for the low part of the multiplication, and a device 5 composed of registers and multiplexers.

In this example, the main components of the circuit are: a pipelined multiplier-adder 1, a 3-input adder, referenced 2, a low part multiplier 3, a 2 bits+1 bit to 2 bits adder, denoted 4 and a barrier of $n_{reg-max}-1$ registers and multiplexers, denoted 5.

The number of multiplexers and registers depends notably on the data intrinsic to the circuit, the pipeline depths p and k, as well as the number of digits of the data.

In the example of FIG. 2, the function of the barrier of $n_{reg-max}-1$ registers and multiplexers (component referenced 5) is notably to delay the arrival of the data in the multiplier-adder 1.

Low Part Multiplication—Component 3

In the main loop of the algorithm, at each iteration, $m_i$, the digit which renders the quantity $S+m_i N$ divisible by r, is determined.

$m_i$ is determined by performing a partial multiplication of the low-order digit of S with a constant N', precomputed once and for all for a given modulus N. In this multiplication, only the low part interests us: this operation is performed modulo r. This operation being slower than an addition, it is also pipelined.

The pipeline depth of this operator is called k and it is assumed that k<p.

Loopback, Latency and Additional Registers

Two cases are distinguished, the switch from classical multiplication $a_i B + T \rightarrow S$, (1), to multiplication and shift $(m_i \times N + S)/r \rightarrow T$, (2), and the switch from (2) to (1), the delay not being the same.

This delay determines notably the number of registers to be used: $n'_{reg}$ or $n_{regk}$ according to case. Thus for example, in the switch from (2) to (1), and in the case where $p+2 \leq n$ (case where $n'_{reg}$ is defined), the number of registers to be used is $n'_{reg}$. As there are $n_{reg-max}-1$ of them, it is necessary to jump $n_{reg-max}-1-n'_{reg}$ of them. This is done by virtue of the multiplexers, placed accordingly.

Switch from (1) to (2)

To be able to chain the multiplications-additions (1) and (2) without loss of time (ie: without adding latency), it is appropriate to determine $m_i$ before having traversed all the digits of the current multiplication.

It is therefore desirable to achieve the condition: $p+k+2 \leq n$.

Specifically, the low-order digit of the result of the multiplication-addition is available when the digit of index $p+1$ arrives at the input of the multiplier-adder.

At the next cycle, the addition is performed. $S_0$ is available, the computation of $m_i$ can therefore start. After $k+1$ additional clock ticks, $m_i$ is available as output from the low part multiplier. It can therefore be used as input for the multiplier-adder at the next clock tick. This explains the condition $p+k+2 \leq n$.

Loopback

If one wants to chain the multiplications-additions (1) and (2), without loss of time, one chooses $p+k+2 \leq n$.

In this case, the datum $m_i$ is available before the end of traversal of the digits of the multiplication-addition in progress. This value is therefore looped back, so as to delay its input into the multiplier-adder. $n_{rebk}=n-p-k-2$ is then defined which corresponds to the number of necessary loopback of this value.

In the particular case where $n_{rebk}=0$, the datum $m_i$ is synchronous with the new inputs of the multiplier-adder.

However, in all cases, the value $m_i$ is looped back n times so that the input is the same for all the digits of N.

If on the other hand $n-p-k-2$ is negative, this corresponds to a delay of the computation of $m_i$, latency is therefore added.

Latency

When the condition $p+k+2 \leq n$ is not achieved, this signifies that the outputs have some delay over the inputs, standby ticks (latency) to synchronize the data are added.

During the latency ticks, the inputs are disabled (in the sense that 0 is taken as new input, to take account of the last carry of S), the computation continuing for the data already input.

In this case ($p+k+2>n$), one defines $n_{latk}=p+k+2-n$. This quantity represents the number of latency ticks to be performed before presenting new inputs to the multiplier-adder.

As soon as $m_i$ is determined, it is used as input for the multiplication-addition. $S_0$ for its part is necessarily determined before $m_i$ and must be stored (as well as $S_1, S_2 \ldots$) until $m_i$ is computed.

For this reason, registers are added so as to delay the arrival of the results at the input of the multiplier-adder.

Additional Registers

Two cases are distinguished. Specifically, depending on whether $p+k+2$ is larger or smaller than n, the number and the use of the extra registers are not the same however.

Case 1: $p+k+2 \leq n$

In this case, the set $S_0$ and $m_i$ is determined before the end of traversal of the digits of the data.

For $m_i$, see the section on loopback, the method described above in the loopback section is used.

For $S_0$, its arrival at the input of the multiplier-adder is delayed by adding shift registers.

$n_{reg}$ is then defined by $n_{reg}=n-p-1$. This quantity corresponds to the number of registers to be added to synchronize the arrival of the low-order digit of the result of a multiplication-addition with the low-order data of the next one.

Case 2: $p+k+2>n$

Two sub-cases depending on whether p is or is no longer larger than n, are distinguished. In fact, whatever the value of p, $m_i$ will be determined after $S_0$.

The arrival of $S_0$ at the input of the multiplier is therefore delayed by adding extra registers. This number of registers will therefore depend only on k, the depth of the pipeline of the low part multiplication operator.

Therefore in this case $n_{regk}=k+1$ is defined, the number of registers to be added to delay the arrival of $S_0$ at the input of the multiplier.

Switch from (2) to (1)

We are concerned here with the switch from (2) to (1). If there is no $m_i$ to be determined, it is necessary on the other hand to take account of the shift (division by r).

As previously, the arrival of the results is synchronized with the input of new data. Here, only the quantity p is significant, $m_i$ not needing to be determined, k is not relevant.

On the other hand, the shift is taken into account (ie: consider $t_0$ to be low-order digit and not $t_1$ which is zero). This can be viewed as an additional pipeline level.

Additional Registers and Latency

Therefore as previously, two cases are distinguished depending on whether $p+2$ is or is not larger than n.

Case 1: $p+2 \leq n$

In this case, to is available before the end of traversal of the digits of the data. Registers are therefore added to take the delay into account. $n'_{reg}=n-p-2$ is then defined, which indicates the number of registers to be added to take the delay into account.

Case 2: $p+2>n$

In this case, $t_0$ is available after the traversal of the digits of the data. The input of the new data is therefore delayed. This is done as previously by adding standby ticks (latency). One defines $n'_{lat}=p+2-n$ which represents the number of standby ticks to be produced.

Extra Adder and Loopback

The determination of $t_n$ is done by adding $s_{n+1}$ with c, $s_{n+1} \leq 2$ and $c \leq 1$. For this purpose a 2 bits+1 bit to 2 bits (logic) adder ($t_n \leq 3$) (component denoted 4) is envisaged.

In the computation of T, the shift makes it possible to economize on the use of a register. The latter is used for storing $s_{n+1}$. This value is stored until c is determined, then the two are added thus releasing the register for storing $s_{n+1}$.

One therefore defines $n_{reb}=n+n_{latk}-1$ which is the number of necessary loopback of $s_{n+1}$.

Correction Parameters

The final design of the component depends notably on the pipeline depths p and k as well as the number, for which it is initially envisaged, of digits n of the long integers. In particular, the number of registers to be added is a tricky point since it is not the same depending on whether the switch from (1) to (2) or the switch from (2) to (1) is the case.

The following summary table 1 relates the quantities p, k and n to the previously defined correction parameters.

TABLE 1

| | p + k + 2 ≦ n | p + k + 2 > n | |
|---|---|---|---|
| | (⇒ p + 2 ≦ n) | p + 2 ≦ n | p + 2 > n |
| $n'_{reg}$ | n − p − 2 | n − p − 2 | 0 |
| $n'_{lat}$ | 0 | 0 | p + 2 + n |
| $n_{reg}$ | n − p − 1 | k + 1 | |
| $n_{latk}$ | 0 | p + k + 2 − n | |
| $n_{rebk}$ | n − p − k − 2 | 0 | |
| $n_{reb}$ | n + $n_{latk}$ − 1 = n − 1 | n + $n_{latk}$ − 1 = p + k + 1 | |

In practice the number of registers to be added is defined by:
$n_{reg\text{-}max}$=max($n_{regk}$, $n_{reg}$) and is equal to n−p−1 if p+k+2≦n and otherwise k+1. In particular, $n_{reg\text{-}max}$ is greater than or equal to 1.

The steps requiring fewer registers are performed by shortening the chain of registers by adding multiplexers.

Sequencing Described in FIG. 2

An exemplary sequencing of the operations is described in conjunction with FIG. 2. The convention is adopted of fixing the states of the multiplexers at the end of the current clock tick to control the following clock tick.

General Behavior of the Multiplexers

The latency is relevant here. Specifically, depending on whether or not there is latency, the changes of state do not happen at the same moments.

It is however possible to use the latency correction parameters of the circuit ($n'_{lat}$ and $n_{latk}$) to define a general behavior of the multiplexers.

Specifically, it may be assumed that $$|B| = n + 1 + n'_{lat}$$

with the first $n'_{lat}$ digits of B zero. (Except obviously for the computation of $a_0$B.)

Likewise, it is possible to assume that N=n+1+$n_{latk}$ with the first $n_{latk}$ digits of N zero.

Moreover, the particular case of the first computation $a_0$B for which the latency is not taken into account (the first $n'_{lat}$ zero digits of B) is singled out.

Finally, this particular case over with, it is noted that the data successively presented as input to the multiplier-adder can be grouped together in branches of 2n+2+$n'_{lat}$+$n_{latk}$ data. The first $n_{latk}$+n+1 correspond to the data $m_i$ and $N_j$. The last $n'_{lat}$+n+1 correspond to the data $a_i$ and $b_j$.

The behavior of the multiplexers will therefore be cyclic, of period 2n+2+$n'_{lat}$+$n_{latk}$.

mux 1 mux1 is a multiplexer with two states symbolizing which type of inputs must be taken into account at the multiplier-adder level. The two states are:
  0: x=$a_i$ and y=$b_j$ are taken as inputs of the multiplier-adder.
  1: x=$m_i$ and y=$N_j$ are taken as inputs of the multiplier-adder.

The use of the constants $n'_{lat}$ and $n_{latk}$ makes it possible notably to verify that the change of state occurs when all the digits of B (or of N) have been traversed.

For $a_0$ the first $n'_{lat}$ zero digits are not taken into account. The computation begins directly with the data $a_0 b_{n'lat}$.

Thus mux1, initially at 0 (reset), remains in this state during the first n clock ticks, and switches to the 1 state at the n+1$^{th}$ tick.

At the end of this n+1$^{th}$ tick, the data presented as input to the multiplier-adder are $a_0$ and $b_n$, all the digits of B will therefore have been traversed.

mux1 is at 1 at the end of this same clock tick, therefore at the end of the following clock tick, $m_1$ and $N_0$ will be presented as input to the multiplier-adder.

The general behavior of mux1 as a function of the clock tick clock can be summarized by the following steps:
If clock<n+1, then mux1=0
Otherwise:
  If (clock−(n+1)mod(2n+2+$n_{latk}$+$n'_{lat}$))<n+1+$n_{latk}$, then mux1=1
  Otherwise mux1=0 mux2 mux2 is a multiplexer with two states symbolizing the moment at which the addition $s_{n+2}$+c must be done. Recall that $s_{n+2}$ is stored in $Stab_1$.

Moreover, when this addition is performed, the carry of the three-input adder must be initialized to 0 since a new addition is beginning.

The two states are:
  0: The addition $s_{n+1}$+c cannot be performed, c is not yet determined.
  1: The inputs $s_{n+1}$ and c are positioned so as to be added at the following clock tick, the carry of the three-input adder is initialized to 0.

This addition is performed once per main iteration (loop over i), it is located in the second loop over the digits of N.

This signifies that mux2 is never in the 1 state twice in succession.

Moreover, this addition pertains to the values of the register $Stab_1$, therefore the pipeline depth p intervenes to determine the behavior of mux2.

The low-order digit ($s_0$) of the product $a_0 \times b_0$ is in the output register of the adder at clock p+3 (=1 (load)+(p+1)($s_0$ in LSB)+1($s_0$ in output register of the adder)).

$s_n$ is therefore in this same register at clock p+3+n. As $s_n$ corresponds to the low-order digit of $a_0 \times b_n$, the following inputs are therefore the digits of N and $m_1$. Now, the addition must be performed when $t_{n-1}$ is located in the output register of the adder since at this moment the right value of carry to be added to $s_{n+1}$ to determine $t_n$ is available.

mux2 must therefore be in the 1 state when $t_{n-1}$ is located in the output register of the adder, that is to say at clock tick p+3+n+$n_{latk}$+n+1=p+2n+$n_{latk}$+4. It should not be forgotten that with the shift, $t_{n-1}$ corresponds to the computation of $m_1 \times N_n$.

By periodicity, it is possible to describe the general behavior of mux2.
  If clock=p+2n+4+$n_{latk}$ mod 2n+2+$n_{latk}$+$n'_{lat}$, then mux2=1
  Otherwise mux2=0 mux3

During the loop over the digits of N, a right shift must be performed on the digits of the output to take account of the division by r. mux3 is a multiplexer with two states symbolizing the moment at which the shift (modeled by a register jump) is performed. The two states are:
  0: The shift is not performed.
  1: The shift is performed.

This shift of index is performed by hardware by jumping a register.

The shift occurs when the datum $s_{n+1}$ is present in the register Stab1. Specifically, at this instant, the register S of the adder contains, according to the value of $n_{latk}$, either 0 (result of a latency tick), or the value of $t_0$. $t_0$ having a delay time with respect to classical multiplication ($s_0$), it must then jump a register so as to make up this delay time. This shift must therefore be performed until all the digits (latency included) of T, up to $t_{n-1}$, are determined. Specifically, when $t_{n-1}$ is determined (ie: in the register S of the adder), at the following clock tick, $t_n$ is determined in Stab1 by addition of c with $s_{n+1}$, and $t_{n-1}$ is located in the register Stab2. The shift then ends, the data $t_{n-1}$ and $t_n$ again being in two successive registers, mux3 therefore remains in the 1 state for $n+n_{latk}=n_{reb}+1$ ticks.

As we stated previously, the shift corresponds to the jump of the register Stab1 which is then used for the loopback to $s_{n+1}$. The loopback to $s_{n+1}$ therefore occurs at the same moment as the shift. Therefore the change of state of mux3 from 0 to 1 also indicates that it is necessary to loop the value $s_{n+1}$ back into the register Stab1. This loopback takes place $n_{reb}$ times.

Initially, mux3 is in the 0 state (classical multiplication). It switches to 1 when $s_{n+1}$ is in the register Stab1. Now, $s_n$ is in S at the clock tick $p+3+n$ (cf: behavior of mux2). Therefore $s_{n+1}$ is in this same register at the tick $p+n+4$, and in Stab1 at the next tick: $p+n+5$.

The general behavior of mux3 is deduced by periodicity: If clock<$p+n+5$, then mux3=0
Otherwise:
  If (clock$-(p+n+5)$)mod($2n+2+n_{latk}+n'_{lat}$))<$n_{reb}+1$, then mux3=1
  Otherwise mux3=0

The previous remark makes it possible to define and to describe the command reb.

Command reb

This command represents the instants for which $s_{n+1}$ must be looped back into the register Stab1.

The two states are:
  0: no loopback
  1: loopback

The behavior of reb is described at the same time as that of mux3. We therefore deduce from this:
If clock<$p+n+5$, then reb=0
Otherwise:
  If (clock$-(p+n+5)$)mod($2n+2+n_{latk}+n'_{latk}$))<$n_{reb}$, then reb=1
  Otherwise reb=0 mux4 mux4 is a multiplexer with two states which forms part of the barrier of registers.

In the cases where this multiplexer is present, it indicates whether it is necessary to use $n'_{reg}$ or $n_{regk}$ registers. The two states are:
  0: Use of all the registers (corresponds to the multiplication (2)).
  1: Use of $n'_{reg}$ registers (corresponds to the multiplication (1)).

mux4 must be in the 1 state when $t_0$ is determined in S. It was seen (cf: mux3) that $s_{n+1}$ is present in S at clock=$p+n+4$, therefore $n_{latk}+1$ clock ticks after, that is to say at clock=$p+n+5+n_{latk}$, $t_0$ is in S.

mux4 must remain at 1 until $t_n$ is located in Stab1 ie for $n+1$ clock ticks.

A general behavior of mux4 is deduced by periodicity:
If clock<$p+n+5+n_{latk}$, then mux4=0
Otherwise:
  If(clock$-(p+n+5+n_{latk}$) mod ($2n+2+n_{latk}+n'_{lat}$))<$n+1$, then mux4=1
  Otherwise mux4=0

Command $reb_k$

The command $reb_k$ indicates the moment at which it is necessary to loop the value of $m_i$ back into the output register of the low part multiplier.

The two states are:
  0: no loopback
  1: loopback

Initially, $reb_k=0$.

$m_1$ is determined (ie: present in the output register of the low part multiplier) at the end of clock tick clock=$p+k+4$. Specifically, $m_1$ is determined with the aid of $s_0$ which is itself present in the register S at the end of clock tick clock=$p+3$ (cf: mux2). It serves therefore as input to the low part multiplier which gives the result $k+1$ clock ticks after, ie at clock=$p+k+4$.

It is therefore necessary to loop this value back from that moment onwards, at least $n+1$ times so that this input is the same for all the digits of N. It is also necessary to take account of the value of $n_{rebk}$ which is the number of necessary loopbacks of $m_1$ in the case where $m_1$ is determined before the traversal of all the digits of B.

The total loopback number for $m_1$ is therefore: $n+1+n_{rebk}$. The general behavior of $reb_k$ is deduced by periodicity: If clock<$p+n+4$, then $reb_k=0$
Otherwise:
  If (clock$-(p+n+4)$)mod($2n+2+n_{latk}+n'_{lat}$))<$n+1+n_{rebk}$, then $reb_k=1$
  Otherwise $reb_k=0$.

The invention claimed is:

1. A device for implementing Montgomery modular multiplication, comprising: a computation cell having
  a multiplier-adder comprising pipelined logic-register pairs, which are configured to receive several digits to be added together and multiplied, at least two outputs of the multiplier-adder corresponding to a low order of the digits and to a high order of the digits, and
  an adder receiving the two outputs of the multiplier-adder, wherein
  a number p of the pipelined logic-register pairs is chosen in such a way that the maximum frequency F1max of the multiplier-adder is greater than or equal to the maximum frequency F2max of the adder,
  said digits of the multiplier-adder includes x, y and z, which correspond to inputs of the multiplier-adder, and
  said two outputs of the multiplier-adder correspond to an operation x×y+z and an operation x×y+z.

2. The device as claimed in claim 1, further comprising a low part multiplier whose inputs correspond to the output corresponding to the low order, and to a precomputed constant,
  wherein said low part multiplier is pipelined over a depth k.

3. The device as claimed in claim 1, further comprising a set of registers and multiplexers that is suitable for delaying arrival of said digits received in the multiplier-adder.

4. The device as claimed in claim 1, further comprising a 2 bits+1 bit to 2 bits adder.

5. The device as claimed in claim 1, wherein the maximum frequency F1max of the multiplier-adder is substantially equal to the maximum frequency F2max of the adder.

6. The device as claimed in claim 2, further comprising a set of registers and multiplexers that is suitable for delaying arrival of said digits received in the multiplier-adder.

7. The device as claimed in claim 2, further comprising a 2 bits+1 bit to 2 bits adder.

* * * * *